(12) United States Patent
Gauthier, III

(10) Patent No.: US 7,946,507 B2
(45) Date of Patent: May 24, 2011

(54) SPRINKLER HEAD LOCATION INDICATOR

(76) Inventor: Leo D. Gauthier, III, Williston, FL (US)

( * ) Notice: Subject to any disclaimer, the term of this patent is extended or adjusted under 35 U.S.C. 154(b) by 0 days.

(21) Appl. No.: 12/659,220

(22) Filed: Mar. 1, 2010

(65) Prior Publication Data

US 2010/0154898 A1   Jun. 24, 2010

Related U.S. Application Data

(63) Continuation of application No. 12/068,663, filed on Feb. 8, 2008, now abandoned.

(60) Provisional application No. 60/924,730, filed on May 29, 2007.

(51) Int. Cl.
*A01G 25/09* (2006.01)

(52) U.S. Cl. ............ 239/1; 239/71; 239/204; 239/288.5

(58) Field of Classification Search ................ 239/1, 71, 239/103, 201–206, 288–288.5; 47/20.1–32.3
See application file for complete search history.

(56) References Cited

U.S. PATENT DOCUMENTS

| | | | |
|---|---|---|---|
| 2,017,308 A | 10/1935 | Elmer | |
| D217,767 S | 6/1970 | Harness | |
| 3,940,884 A | 3/1976 | Mason, Jr. | 47/32 |
| 5,211,338 A | 5/1993 | Leite et al. | |
| 5,213,262 A | 5/1993 | Violette | |
| 5,323,557 A | 6/1994 | Sonntag | 47/32 |
| 6,186,416 B1 | 2/2001 | Jones | |
| 6,209,803 B1 | 4/2001 | Colo'n | |
| 6,543,704 B2 | 4/2003 | Stephens | |
| 7,216,819 B2 | 5/2007 | Bernards | 239/288.5 |
| 2001/0032890 A1 | 10/2001 | Stephens | |
| 2004/0217195 A1 | 11/2004 | Bernards | |

*Primary Examiner* — Christopher S Kim

(74) *Attorney, Agent, or Firm* — Richard C. Litman

(57) ABSTRACT

The sprinkler head location indicator is a shallow dish adapted for placement on the shaft of a pop-up sprinkler head. The dish is concave upward and has a small pilot hole formed through its center. A plurality of radially extending guidelines is formed on the bottom surface of the dish, the guidelines having hash marks at uniform intervals to form scale markings. The guidelines are severed radially to a uniform length forming flexible segments and the dish is pushed up the shaft to the ground flange of the sprinkler head. The flexible segments bend against the sprinkler head shaft, thereby retaining the dish on the shaft.

5 Claims, 4 Drawing Sheets

SPRINKLER HEAD LOCATION INDICATOR

CROSS-REFERENCE TO RELATED APPLICATION

This application is a continuation of application Ser. No. 12/068,663, filed Feb. 8, 2008 now abandoned, which claims the benefit of U.S. Provisional Application Ser. No. 60/924,730, filed May 29, 2007.

BACKGROUND OF THE INVENTION

1. Field of the Invention

The present invention generally relates to lawn sprinklers, and particularly to a sprinkler head location indicator for locating pop-up sprinkler heads.

2. Description of the Related Art

Accidental damage to pop-up sprinkler heads and the PVC pipe to which they are attached often occurs because the heads are hidden in tall grass and are hit or run over by a lawn mower. The sprinkler heads are often knocked off completely or knocked out of their set positions, causing the sprinklers to water the street, sidewalk, the walls of a building or cars in a driveway. In addition, grass frequently grows up around the sprinkler heads, preventing the proper operation of the pop-up mechanism. In some instances, the pop-up sprinkler head is not installed flush with the ground, but remains raised slightly above the ground when the sprinkler is retracted. Such installations are commonly used with gardens, flower beds, hedges, and the like to ensure that the sprinkler will elevate high enough to spray water over the vegetation, foliage, bushes, etc. Such pipes and sprinkler heads are thin and sometimes difficult to distinguish, resulting in damage to the sprinkler head during landscaping activities. Thus, a sprinkler head location indicator solving the aforementioned problems is desired.

SUMMARY OF THE INVENTION

The sprinkler head location indicator is a shallow dish adapted for placement on the shaft of a pop-up sprinkler head. The dish is concave upward and has a small pilot hole formed through its center. A plurality of radially-extending guidelines are formed on the bottom surface of the dish, the guidelines having hash marks at uniform intervals to form scale markings at various diameters. In use, the guidelines are severed radially to a uniform length slightly smaller than the diameter of the shaft of the sprinkler head, and the dish is pushed up the shaft to the ground flange of the sprinkler head. The dish is formed of a flexible, resilient material, so that the segments formed by severing the guidelines flex and bend against the sprinkler head shaft, thereby retaining the dish on the shaft.

The dish provides a visible indicator marking the location of the sprinkler head that is readily apparent to avoid damage to the sprinkler head when operating lawn mowers or other landscaping equipment. Since the dish is resiliently held against the sprinkler head shaft, grass cannot grow between the indicator and the sprinkler head, preventing the sprinkler head from being covered by vegetation. Moreover, since the indicator is resiliently held against the sprinkler head shaft, the sprinkler head location indicator may be used with sprinkler heads that are not flush with the ground when retracted, but extend above the ground.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
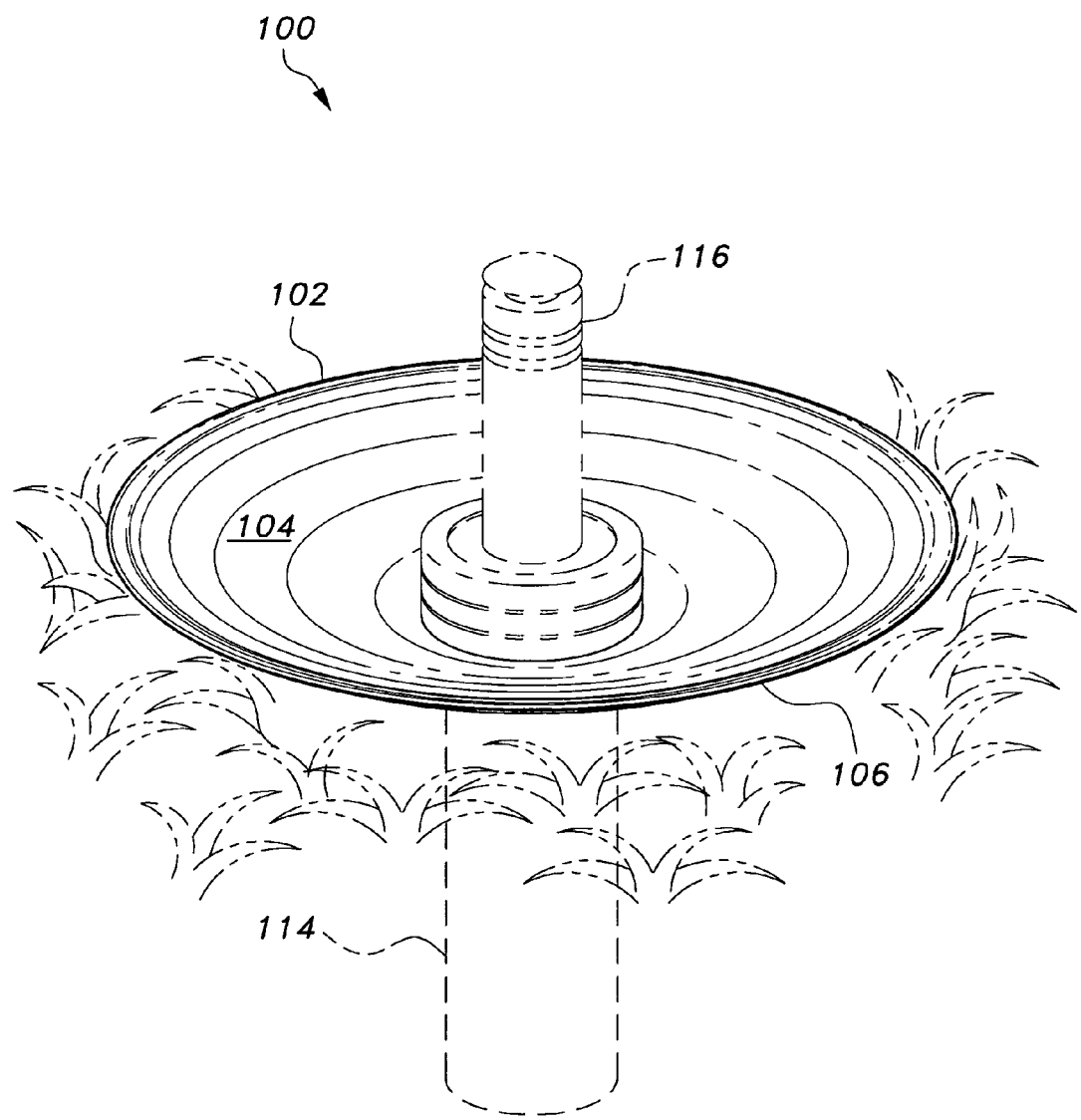
FIG. 1 is an environmental, perspective view of a sprinkler head location indicator according to the present invention.
Figure 2:
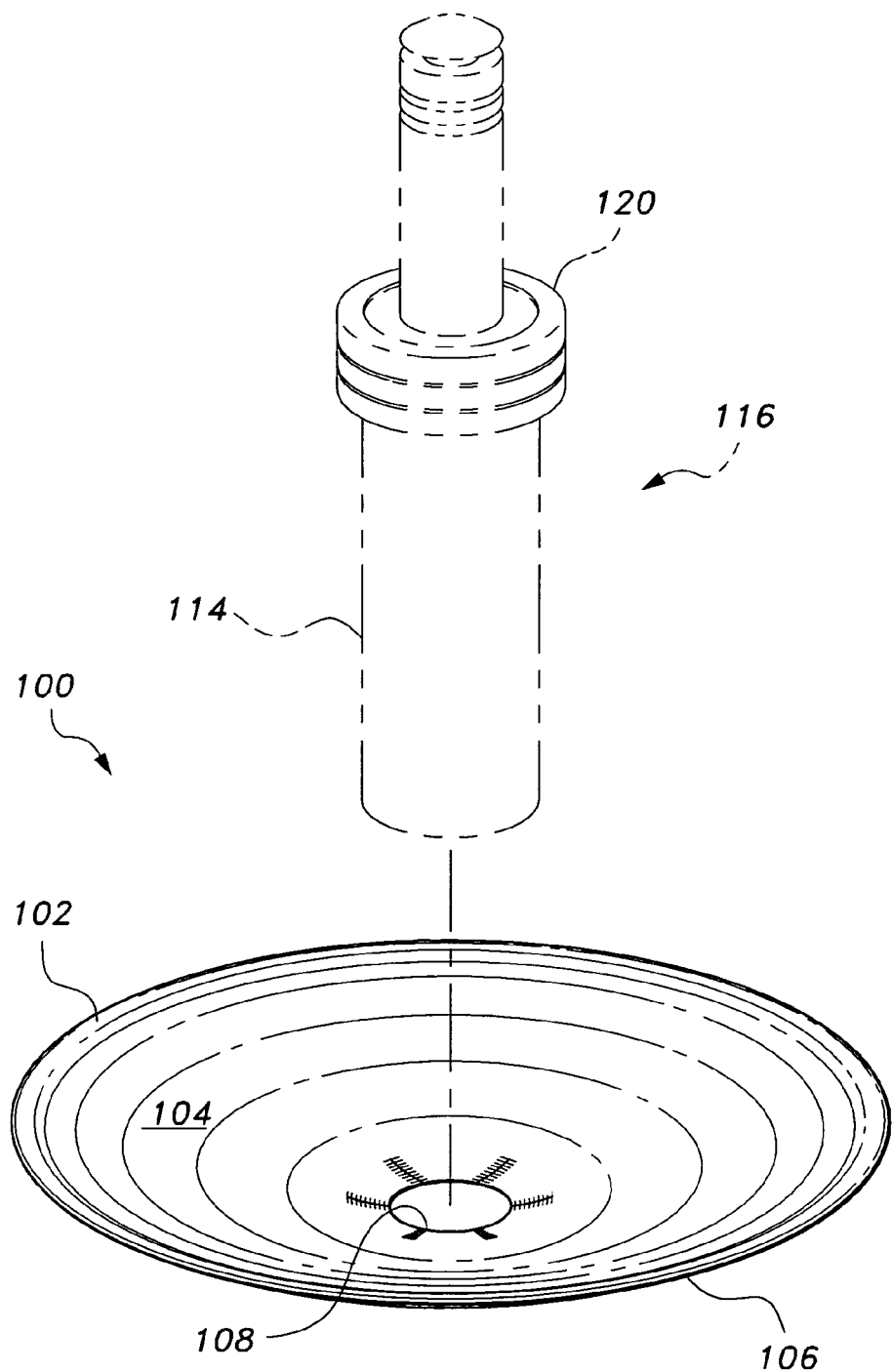
FIG. 2 is a perspective view of the sprinkler head location indicator according to the present invention.
Figure 3:
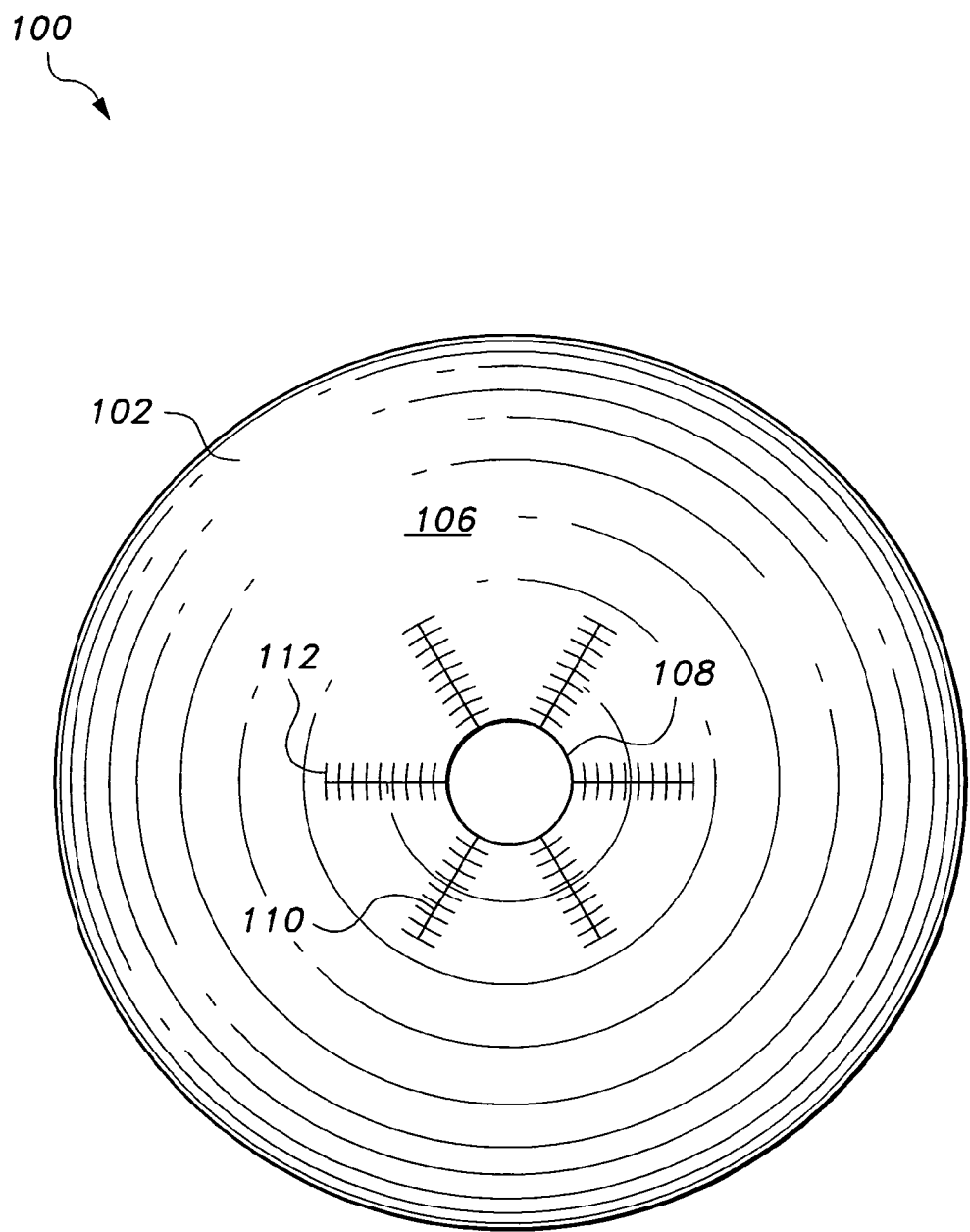
FIG. 3 is a bottom view of the sprinkler head location indicator according to the present invention.

The present invention is a sprinkler head location indicator, designated generally as 100 in the drawings, for marking the location of pop-up sprinkler heads. As shown in FIGS. 1 and 2, the sprinkler head location indicator 100 is a shallow dish 102 having a concave upper face 104 and a convex lower face 106, which directs grass surrounding the sprinkler head to grow outward, away from the sprinkler head. The dish 102 has pilot hole 108 formed through its center. The pilot hole 108 has a small diameter, preferably smaller than the diameter of conventional sprinkler head shafts. The diameter of the pilot hole 108 may be, e.g., about one-half inch. As shown in FIG. 3, a plurality of radially extending guidelines 110 are formed on the lower face 106 (the bottom surface) of the dish 102. The guidelines 110 may comprise a slight ridge, a shallow depression, a thinned area, perforations, a painted line, or any other form of visual or tactile indicia to mark radially extending lines on the lower face 106. The guidelines 110 have a plurality of hash marks 112 forming scale markings at uniform length intervals along the radial guidelines 110.

In use, the user may use scissors, a utility knife, or any other suitable cutting instrument to sever each of the radially extending guidelines 110 so that the severed portions of the guidelines 110 extend to a length slightly smaller than the diameter of the shaft 114 of the sprinkler head 116. The hash marks 112 are provided to assist the user in severing the guidelines 110 to a uniform length. Severing the guidelines 110 forms a plurality of retainer tabs or flaps 118. The dish 102 is formed of a flexible, resilient material, such as polyvinyl resin or other suitable material, and is also durable, lightweight, shatterproof, rugged, waterproof, and may be treated with additives to prevent discoloration by ultraviolet radiation from exposure to sunlight.

Figure 4:
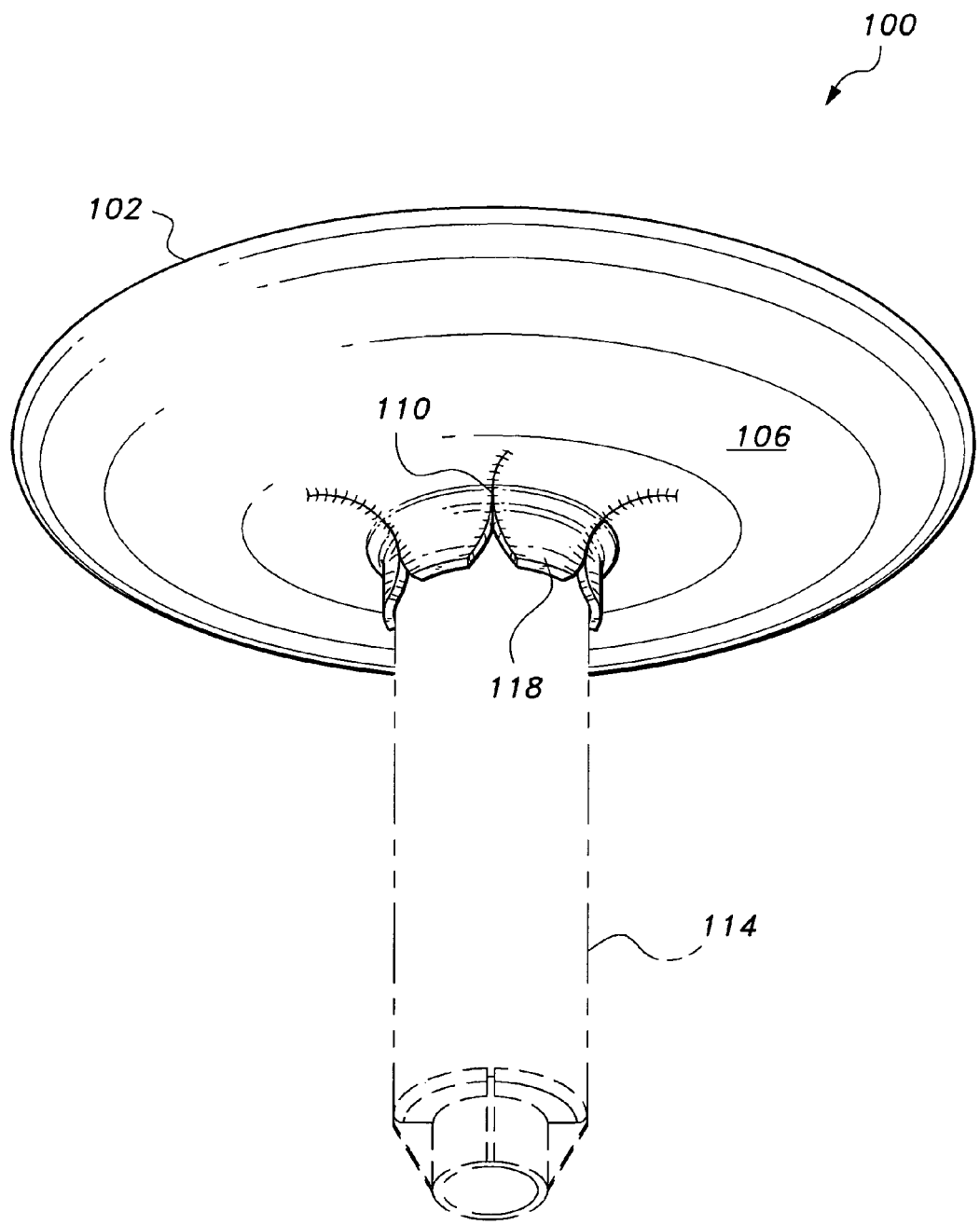
FIG. 4 is an environmental perspective view the sprinkler head location indicator according to the present invention attached to a sprinkler head housing as seen from below.

After the guidelines 110 have been uniformly severed, the dish 102 is pushed onto the shaft of the 114 of the sprinkler head 116 up to the ground-mounting flange or collar 120, as shown in FIG. 4, and the shaft 114 may then be threaded onto the underground water supply pipe (not shown). The flexible, resilient nature of the retainer tabs 118 causes the dish 102 to snuggly engage the sprinkler head shaft 114, the tabs 118 bending and resiliently engaging the shaft 114. The close engagement of the dish 102 with shaft 114 prevents the growth of grass or weeds between the location indicator 100 and the sprinkler head 116, thus preventing the sprinkler head 116 from becoming entangled or hidden in undergrowth. Moreover, resilient engagement of the dish 102 with the shaft 114 permits the use of the location indicator 100 with sprinkler heads that are raised above ground for watering gardens, flower beds, bushes and shrubs, etc.

The provision of radially extending guidelines 110 with hash marks 112 to graduate the guidelines 110 permits the location indicator 100 to be adjusted to fit sprinkler heads having shafts of different diameter. The dish 102 may be formed in any desired color and in any diameter to render the location indicator 100 highly visible, and may be coated with fluorescent material for the same purpose, if desired. The sprinkler head location indicator 100 can be made decorative or more appealing to the eye by ornamentation that is printed, stamped, or coated onto the dish 102 simulating a flower, sport team logos, etc.

If run over by the wheels of a mower, the resilient nature of the location indicator 100 allows it to rebound back to its original shape. The location indicator 100 will not get sucked into a mower or become a projectile, even if hit by mower blades.

It is to be understood that the present invention is not limited to the embodiment described above, but encompasses any and all embodiments within the scope of the following claims.

I claim:

1. Method of installing a sprinkler head location indicator, the method comprising the steps of:
    providing a sprinkler head shaft wherein the shaft includes an annular collar at its upper end and a telescopic pop-up sprinkler head therein;
    providing a sprinkler head location indicator, the indicator including a dish having a continuous upper face and a continuous lower face, the upper face and the lower face each having a lower end and an upper end, the indicator being fabricated from a flexible material, a pilot hole extending through a center of the dish at the lower ends of the faces, a plurality of radially-extending guidelines defined on the lower end of the lower face, each of said plurality of guidelines having one end located at the pilot hole and its other end located intermediate the pilot hole and the upper end of the upper face, and a plurality of hash marks defined at intervals on the guidelines to form scale markings for severing the guidelines to uniform length;
    measuring the diameter of the sprinkler head shaft;
    severing each of the plurality of radially extending guidelines to a hash mark approximating the measured shaft diameter thereby creating a plurality of flexible tabs for retaining the indicator on the shaft;
    inserting the sprinkler shaft through the pilot hole, thereby allowing the tabs to remain snug against the shaft; and
    pulling the indicator upwardly into contact with the annular collar.

2. The method of installing a sprinkler head location indicator according to claim 1, wherein the indicator is fabricated from a resilient material.

3. The method of installing a sprinkler head location indicator according to claim 2, wherein the material is a polyvinyl resin.

4. The method of installing a sprinkler head location indicator according to claim 1, wherein the diameter of the pilot hole is about one-half inch.

5. The method of installing a sprinkler head location indicator according to claim 1, wherein the sprinkler head shaft is coupled to an underground water source.

* * * * *